UNITED STATES PATENT OFFICE.

WILBURT C. TRUSSELL, OF BOSTON, MASSACHUSETTS, ASSIGNOR TO THE TRUSSELL AUTOMATIC FREEZER COMPANY, OF MAINE.

REFRIGERATING COMPOUND.

SPECIFICATION forming part of Letters Patent No. 484,983, dated October 25, 1892.

Application filed November 2, 1891. Serial No. 410,601. (No specimens.)

*To all whom it may concern:*

Be it known that I, WILBURT C. TRUSSELL, of Boston, in the county of Suffolk and State of Massachusetts, have invented certain new and useful Improvements in Refrigerating Compounds, of which the following is a specification.

This invention has for its object to provide a new refrigerating agent of an inexpensive and efficient nature; and it consists in the improved agent and process which I will now proceed to describe and claim.

In carrying out my invention I take the following ingredients in the following proportions, viz.: Two pounds muriate of ammonia, one ounce bicarbonate of soda, thirty grains permanganate of potash, two pounds nitrate of potash, and three pints brine, preferably made from Turk's Island salt and water, said brine being preferably not less than twenty-four hours old.

I inclose this compound in a suitable receptacle, preferably a tin can or box hermetically sealed or not, as may be preferred, and add to it a suitable quantity of ice, preferably using a block or solid mass of ice, although the ice may be crushed or broken into small fragments, if desired.

A receptacle containing the above compound and ice in contact with the compound, placed in a room or refrigerating-apartment, will cool the surrounding air to a very considerable extent. I have found that one such receptacle containing said ingredients in the quantities above specified will reduce the temperature of the air in a room or apartment of considerable size to a point below freezing.

When it is desired to cool or freeze water by the use of the described iced compound, I place the water in any suitable receptacle and expose the water to contact with the exterior of the receptacle or casing containing the iced compound, said casing being preferably formed to surround the water in the receptacle.

It will be seen that the described compound is comparatively inexpensive, as all the principal ingredients are well known and of little cost on the market.

The chief advantage resulting from the use of a refrigerating agent consisting of the described compound and ice in the presence thereof is the duration of its effectiveness. I have practically demonstrated that it remains effective and without appreciable loss of refrigerific effect for as many as six days, and I have no reason to doubt that it will retain its effectiveness for a much longer period.

I find that in practice there is a mutual action between the compound and the ice. The compound alone will produce a refrigerific effect; but its effectiveness is greatly increased by the presence of ice, the term of its usefulness being lengthened by the action of the ice. The compound acts to preserve and prevent the rapid melting of the ice, thus increasing the term of usefulness of the latter. I do not limit myself to placing the ice in actual contact with the compound, although this is preferable. The ice may be placed in close proximity to the vessel containing the compound without actual contact with the latter.

I claim—

A refrigerating agent composed of muriate of ammonia, bicarbonate of soda, permanganate of potash, nitrate of potash, brine, and ice, as set forth.

In testimony whereof I have signed my name to this specification, in the presence of two subscribing witnesses, this 29th day of October, A. D. 1891.

WILBURT C. TRUSSELL.

Witnesses:
C. F. BROWN,
A. D. HARRISON.